United States Patent
Park et al.

(10) Patent No.: US 7,834,589 B2
(45) Date of Patent: Nov. 16, 2010

(54) APPARATUS AND METHOD FOR BUCKING VOLTAGE OF BATTERY PACK

(75) Inventors: Jong Min Park, Daejeon (KR); Do Yang Jung, Hwaseong-si (KR)

(73) Assignee: LG Chem, Ltd. (KR)

( * ) Notice: Subject to any disclaimer, the term of this patent is extended or adjusted under 35 U.S.C. 154(b) by 265 days.

(21) Appl. No.: 11/333,858

(22) Filed: Jan. 17, 2006

(65) Prior Publication Data

US 2006/0197505 A1   Sep. 7, 2006

(30) Foreign Application Priority Data

Jan. 14, 2005   (KR)   ................ 10-2005-0003849

(51) Int. Cl.
*H02J 7/00*   (2006.01)
(52) U.S. Cl. .............. 320/135; 320/129; 320/130; 320/131
(58) Field of Classification Search ............. 320/134, 320/127, 133, 129, 130, 131, 135
See application file for complete search history.

(56) References Cited

U.S. PATENT DOCUMENTS 5,637,980 A * 6/1997 Wu ..................... 320/128
5,708,351 A   1/1998 Takamoro 2003/0169189 A1   9/2003 Brett et al.

FOREIGN PATENT DOCUMENTS

| CN | 03235693.5 | | 4/2004 |
| GB | 2259814 A | * | 3/1993 |
| JP | 09-063652 | | 3/1997 |

OTHER PUBLICATIONS

Journal of Jiangnan College, vol. 16, No. 2, pp. 60-64, Jun. 2001, "A New Style Intelligent System for Inspection of Accumulator".

* cited by examiner

*Primary Examiner*—Bao Q Vu
*Assistant Examiner*—Nguyen Tran
(74) *Attorney, Agent, or Firm*—Cantor Colburn LLP

(57) ABSTRACT

An apparatus and method for discharging a voltage in a battery pack. The apparatus includes a discharge resistance connected to a discharge target battery of plural batteries in the battery pack and discharging a voltage of the discharge target battery, a switching section for connecting the discharge target battery and the discharge resistance, a voltage measuring section for measuring a voltage of the discharge target battery, and a control section for controlling the switching section depending on the measured voltage value of the battery. The method includes measuring a voltage of the discharge target battery, calculating a PWM duty rate of a switching section connecting the discharge target battery and a discharge resistance using the measured voltage value and a value of the discharge resistance, and controlling the switching section based on the duty rate to maintain an energy consumed in the discharge resistance to be constant.

12 Claims, 3 Drawing Sheets

FIG 1. – PRIOR ART
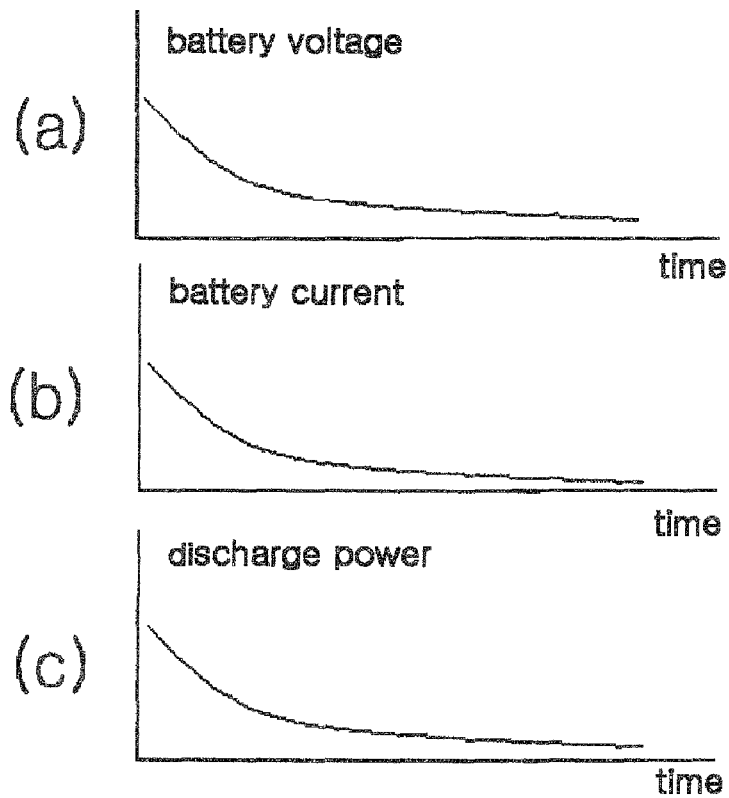
FIG 2.
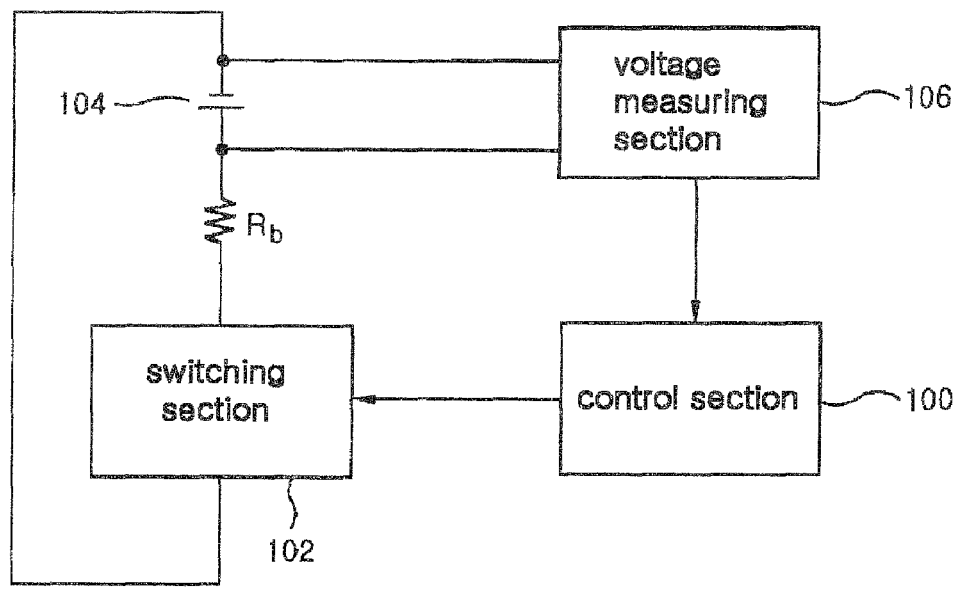

APPARATUS AND METHOD FOR BUCKING VOLTAGE OF BATTERY PACK

This application claims the benefit of Korean Patent Application No. 10-2005-0003849, filed on Jan. 14, 2005 in Korea Industrial Property Office, which is hereby incorporated by reference in its entirety for all purposes as if fully set forth herein.

TECHNICAL FIELD

The invention relates to an apparatus and method for discharging a battery using a pulse width modulation (PWM) way when balancing batteries of a battery pack provided to an electric vehicle, hybrid vehicle and the like.

BACKGROUND ART

For example, an electric vehicle using an electric energy as a power source is provided with a battery pack consisting of plural batteries so that it is supplied with necessary power. For the plural batteries contained in the battery pack, it is required to uniform a voltage of each battery so as to improve stability and span thereof and to obtain a high power. The electric vehicle is provided with a plurality of battery packs depending on vehicle structures, each of packs consisting of 10 batteries. A battery management system (BMS) charges or discharges the batteries of the battery pack to enable each of batteries to have an appropriate voltage. However, since it is difficult for the plural batteries to stably maintain an equilibrium state due to various causes such as change of an internal impedance, etc., a balancing function for equilibrating charged states of the plural batteries is provided to the battery management system.

For doing so, according to the prior art, in order to uniform voltages of the batteries in a high voltage battery pack using the plural batteries, a discharge resistance (buck resistance) is connected to a battery exhibiting a higher voltage than a mean voltage so that energy of the battery is consumed through the resistance, thereby reducing a difference of voltages in the whole battery pack. This method performs the discharge in an on/off manner by a control circuit. However, according to this method, as the discharge is carried out, the battery voltage is dropped. If a voltage is dropped and a resistance is fixed, a current capacity is also dropped due to Ohm's law (V=IR). Accordingly, as the discharge proceeds, an effect of the discharge is also decreased. In addition, in case of using a solid state relay (SSR), since there are limitations in the maximum current capacity allowable in the SSR, an initial discharge is carries out with a low current, so that it takes much time to perform the discharge. In addition, since the time for performing the discharge is extended, it is not possible to perfectly complete the discharge operation within the limited time.

FIG. 1 shows a battery voltage, a battery current and a discharge energy when a battery is conventionally discharged. In the conventional discharge method, a discharge target battery and a discharge resistance are connected to drop the voltage of the discharge target battery. At this time, as shown in FIG. 1, it can be seen that the discharge effect is reduced as time goes by, since the discharge resistance is fixed.

For example, provided that the highest voltage of the battery is 4.5V and a consumption power of the discharge resistance is 1 W, the current (I) is about 220 mA (P=VI). Accordingly, the resistance (R) is determined to be 22.5 (V=IR). In this case, in the method of using the fixed resistance as the prior art, if the determined resistance (R=22.5) is used when the voltage of the battery becomes 2.5V, the flowing current is about 110 mA (V=IR).

At this time, the discharge power P consumed by the resistance is about 0.275 W (P=VI).

In other words, since the power is consumed in the discharge resistance, the voltage and the current are decreased as time goes by, so that the energy consumed by the discharge resistance is also reduced.

As described above, according to the prior art, the discharge effect is decreased as the discharge performing time lapses, so that it is delayed the reduction in the battery voltage and thus the discharge cannot be perfectly carried out within the limited time.

DISCLOSURE OF THE INVENTION

Accordingly, the invention has been made to solve the above problems. An object of the invention is to provide an apparatus and method for discharging a battery adapted to carry a battery discharge rapidly in a battery pack in which voltages are non-uniform.

The invention provides a method for discharging a voltage of a specific battery with a battery management system (BMS) used to uniform voltages of plural batteries in a battery pack, wherein the battery and a discharge resistance are connected through a solid state relay (SSR), and a maximum current limitation acceptable in the SSR and a maximum power acceptable in the discharge resistance are controlled in a PWM manner using a control signal of the SSR, based on voltages of the battery, to allow a mean current capacity flowing in the connected SSR to be same as the maximum acceptable current capacity so that a remaining charged amount of the battery is dropped within a short time while an operational stability of the SSR is secured. In other words, according to the invention, a PWM-type control signal is applied to the SSR so that the energy consumed by the discharge resistance (buck resistance) is constant.

In accordance with an aspect of the invention, there is provided a battery discharging method comprising steps of: measuring a voltage of a discharge target battery of plural batteries in a battery pack; calculating a PWM duty rate of a switching section connecting the discharge target battery and a discharge resistance using the measured voltage value and a value of the discharge resistance; and controlling the switching section depending on the duty rate to maintain an energy consumed in the discharge resistance to be constant.

In accordance with another aspect of the invention, there is provided a battery discharging apparatus comprising a discharge resistance connected to a discharge target battery of plural batteries in a battery pack and discharging a voltage of the discharge target battery; a switching section for connecting the discharge target battery and the discharge resistance; a voltage measuring section for measuring a voltage of the discharge target battery; and a control section for controlling the switching section depending on the measured voltage value of the battery so as to maintain an energy consumed in the discharge resistance to be constant.

BRIEF DESCRIPTION OF THE DRAWINGS

The above and other objects, features and advantages of the present invention will be more apparent from the following detailed description taken in conjunction with the accompanying drawings, in which:

FIGS. 1A to 1C are waveform diagrams of a battery voltage, a battery current and a discharge power when a battery is conventionally discharged;

FIG. 2 is a view showing a structure of a battery discharging apparatus according to a preferred embodiment of the invention;

MODE FOR CARRYING OUT THE INVENTION

Hereinafter, a preferred embodiment of the present invention will be described with reference to the accompanying drawings. In the following description of the present invention, a detailed description of known functions and configurations incorporated herein will be omitted when it may make the subject matter of the present invention rather unclear.

Figure 3:
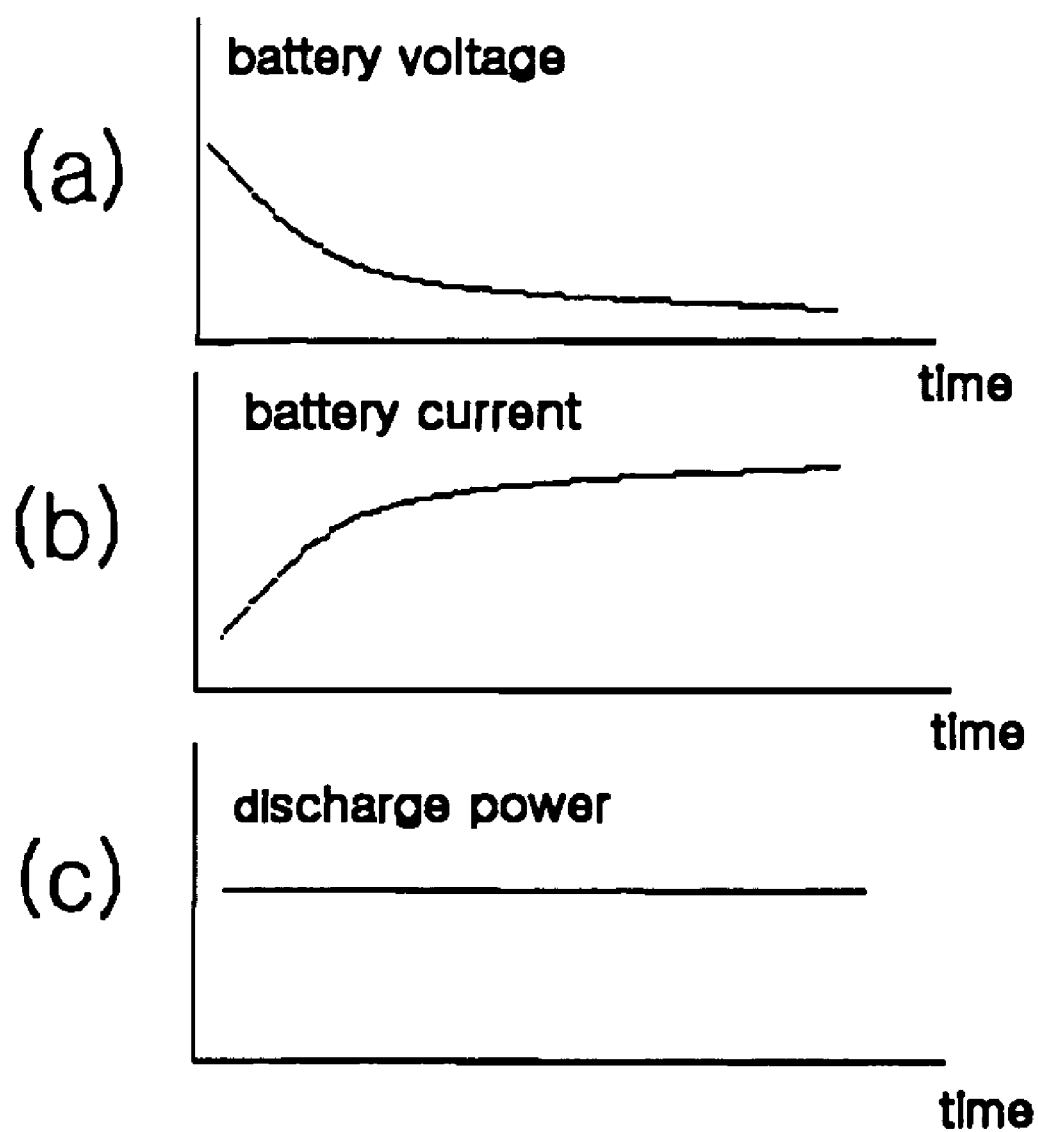
FIGS. 3A to 3C are waveform diagrams of a battery voltage, a battery effective current and a discharge power when a battery is discharged according to a preferred embodiment of the invention.
Figure 4:
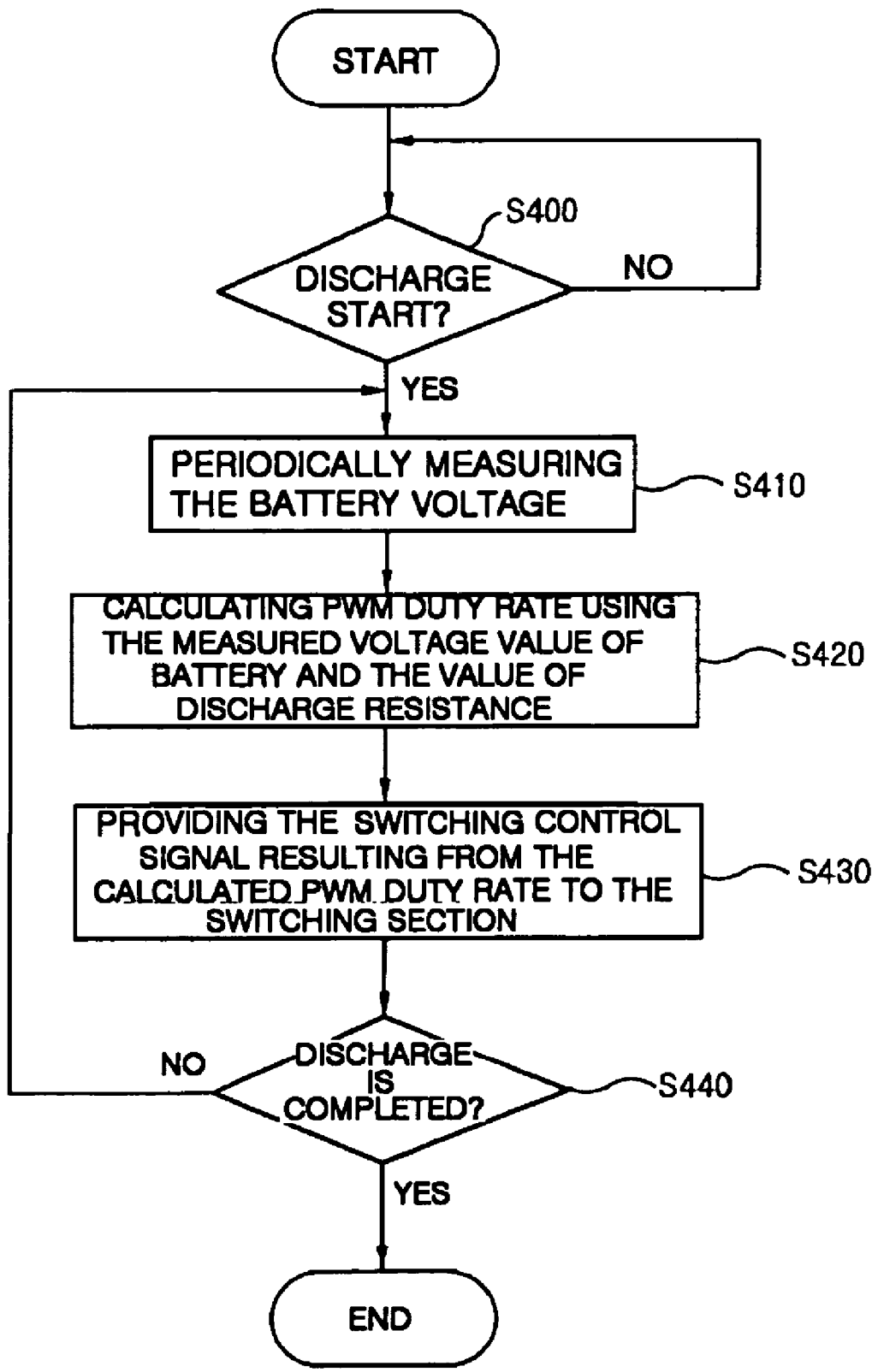
FIG. 4 is a flow chart showing a battery discharging method according to a preferred embodiment of the invention.

FIG. 2 is a view showing a structure of a battery discharging apparatus according to a preferred embodiment of the invention, FIGS. 3a to 3c are graphs showing a battery voltage, a battery effective current and a discharge power when the invention is applied, and FIG. 4 is a flow chart showing a battery discharging method according to a preferred embodiment of the invention.

First, the battery discharging apparatus shown in FIG. 1 comprises a battery 104, a discharge resistance $R_b$ discharging power charged in the battery 104, a switching section 102 connecting the battery 104 and the discharge resistance $R_b$, a voltage measuring section 106 for measuring a voltage of the battery 104, and a control section 100 for controlling the switching section depending on the measured voltage value of the battery so as to maintain an energy consumed in the discharge resistance to be constant.

The invention structured as described above has technical characteristics in that an effective current applied to the discharge resistance is adjusted through a PWM control to maintain the discharge power consumed in the discharge resistance to be constant, so that a constant energy can be discharged irrespective of a voltage drop of a battery as time goes by.

Hereinafter, a process of the invention will be specifically described.

First, if one battery 104 is discharged for the purpose of balancing a battery pack provided in an electric or hybrid vehicle, the voltage measuring section 106 measures a voltage of the battery 104 periodically, for example every 1 sec until the discharge of the battery 104 is completed. When the measured voltage value is supplied to the control section 100, the control section 100 calculates a PWM duty rate using the measured voltage value of the battery 104 and a value of the discharge resistance. The calculation process is as follows.

$$P=VI \quad \text{(equation 1)}$$

$$V=IR \quad \text{(equation 2)}$$

Provided that the discharge resistance is $R_b$, the lowest voltage when the discharge is performed so as to calculate the discharge resistance $R_b$, i.e., the lowest voltage within a use range of a battery is $V_{min}$, a current flowing at the lowest voltage is $I_{min}$ and the discharge power consumed by the discharge resistance $R_b$ is $P_{max}$, a following equation is induced from the equations 1 and 2.

$$R_b=V_{min}^2/P_{max} \quad \text{(equation 3)}$$

In order to regulate a current applied to the discharge resistance $R_b$ when the discharge is carried out using the discharge resistance $R_b$ set, a switching operation is performed in a pulse width modulation (PWM) manner to adjust an effective current. At this time, provided that the adjusted current is $I_{PWM}$, a current which is not subject to the PWM duty adjustment, i.e., a current when the duty rate is 100% is Inormal, and a present voltage is $V_b$, a calculation equation of the PWM duty rate is obtained from following two equations.

$$I_{PWM}=P_{max}/V_b \quad \text{(equation 4)}$$

$$I_{normal}=V_b/R_b \quad \text{(equation 5)}$$

$$PWM \text{ duty rate}=(I_{PWM}/I_{normal})*100(\%) \quad \text{(equation 6)}$$

From the above three equations, a following equation is induced.

$$PWM \text{ duty rate}=(R_b*P_{max}/V_b^2)*100(\%) \quad \text{(equation 7)}$$

Also, from the equations 3 and 7, a following equation is obtained.

$$PWM \text{ duty rate}=(V_{min}^2/V_b^2)*100(\%) \quad \text{(equation 8)}$$

In order to facilitate the understanding, an example with regard to the equations 3 and 7 is taken as follows.

If $P_{max}=1$ W and $V_{min}=2.5$V, it is obtained $R_b$ (=6.25) from the equation 3. At this time, the PWM duty rate should be 100% when $V_b$ reaches $V_{min}$. Accordingly, it can be seen from the equation 8 that the PWM duty rate becomes 100% when $V_b$ is 2.5V. In addition, when $V_b$ is 4.5V, the PWM duty rate becomes about 30.86% according to the equation 8.

In other words, the control section 100 can determine $R_b$ from the equation 3 and obtain the duty rate using the battery voltage $V_b$, which is obtained whenever the voltage is measured, according to the equation 8.

When the duty rate is calculated according to the battery voltage measured at the present time, the control section 100 controls the switching section 102 to switch a connected state of the discharge battery 104 and the discharge resistance $R_b$, based on the calculated PWM duty rate.

The switching section 100 can prolong a lifespan thereof and perform a more reliable switching by using a solid state relay (SSR), which is a semiconductor relay, for example.

The above processes are repetitively carried out by periodically measuring present battery voltages until the discharge of the corresponding battery 104 is completed.

As described above, according to the invention, the effective current is regulated through the PWM control of the switching section, correspondingly to the voltage drop of the battery occurring when the battery of the battery pack provided to the electric or hybrid vehicle is discharged. Accordingly, the discharge power can be maintained to be constant irrespective of the voltage of the battery, so that the battery can be rapidly discharged.

In addition, since the watt (W) value of the resistance used for the discharge is not determined in consideration of the maximum voltage of the battery but calculated from the effective power adjusted by the PWM control, it is not required to use a resistance having a high W value beyond necessity, so that there is many advantages in the product mounting and the costs.

Further, in case that the SSR is adopted as the switching section, since there is the maximum current capacity acceptable in the SSR, the device may be damaged when the discharge is performed in consideration of the maximum voltage of the battery. However, according to the invention, since the discharge operation is carried out by the voltage adjusted through the PWM control, the mean current capacity flowing in the SSR is within the maximum current capacity acceptable in the SSR. Accordingly, there is no possibility of the device damage and the operational stability is also improved.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A voltage discharging apparatus in a battery pack comprising:
    a discharge resistance connected to a discharge target battery of plural batteries in the battery pack and discharging a voltage of the discharge target battery;
    a switching section for connecting the discharge target battery and the discharge resistance;
    a voltage measuring section for measuring a voltage of the discharge target battery; and
    a control section for controlling the switching section such that an effective current applied to the discharge resistance is adjusted depending on the measured voltage value of the battery so as to maintain an energy consumed in the discharge resistance to be constant.

2. The apparatus according to claim 1, wherein the switching section is a solid state relay (SSR).

3. The apparatus according to claim 1, wherein the control section controls the switching section to adjust a duty rate in a PWM manner.

4. The apparatus according to claim 2, wherein a mean current capacity flowing in the SSR is a maximum acceptable current capacity.

5. The apparatus according to claim 3, wherein a value of the discharge resistance is determined so that a duty rate becomes 100% when a measured value ($V_b$) of the battery reaches the lowest voltage ($V_{min}$) within a use range of the battery.

6. The apparatus according to claim 3, wherein the PWM duty rate is calculated by a following equation, $$PWM \text{ duty rate} = (R_b * P_{max}/V_b^2) * 100(\%) = (V_{min}^2/V_b^2) * 100(\%)$$

where, $V_b$: measured voltage of battery,
    $V_{min}$: lowest voltage within a use range of battery
    $P_{max}$: power consumed by the discharge resistance ($R_b$).

7. A voltage discharging method in a battery pack comprising steps of:
    measuring a voltage of a discharge target battery of plural batteries in the battery pack;
    calculating a PWM duty rate of a switching section connecting the discharge target battery and a discharge resistance using the measured voltage value and a value of the discharge resistance such that an effective current applied to the discharge resistance is adjusted depending on the measured voltage value of the battery; and
    controlling the switching section depending on the duty rate to maintain an energy consumed in the discharge resistance to be constant.

8. The method according to claim 7, wherein the switching section is a solid state relay (SSR).

9. The method according to claim 7, wherein the control section controls the switching section to adjust a duty rate in a PWM manner.

10. The method according to claim 8, wherein a mean current capacity flowing in the SSR is a maximum acceptable current capacity.

11. The method according to claim 7, wherein a value of the discharge resistance is determined so that a duty rate becomes 100% when a measured value ($V_b$) of the battery reaches the lowest voltage ($V_{min}$) within a use range of the battery.

12. The method according to claim 7, wherein the PWM duty rate is calculated by a following equation, $$PWM \text{ duty rate} = (R_b * P_{max}/V_b^2) * 100(\%) = (V_{min}^2/V_b^2) * 100(\%)$$

where, $V_b$: measured voltage of battery,
    $V_{min}$: lowest voltage within a use range of battery
    $P_{max}$: power consumed by the discharge resistance ($R_b$).

* * * * *